Figures 1, 2:
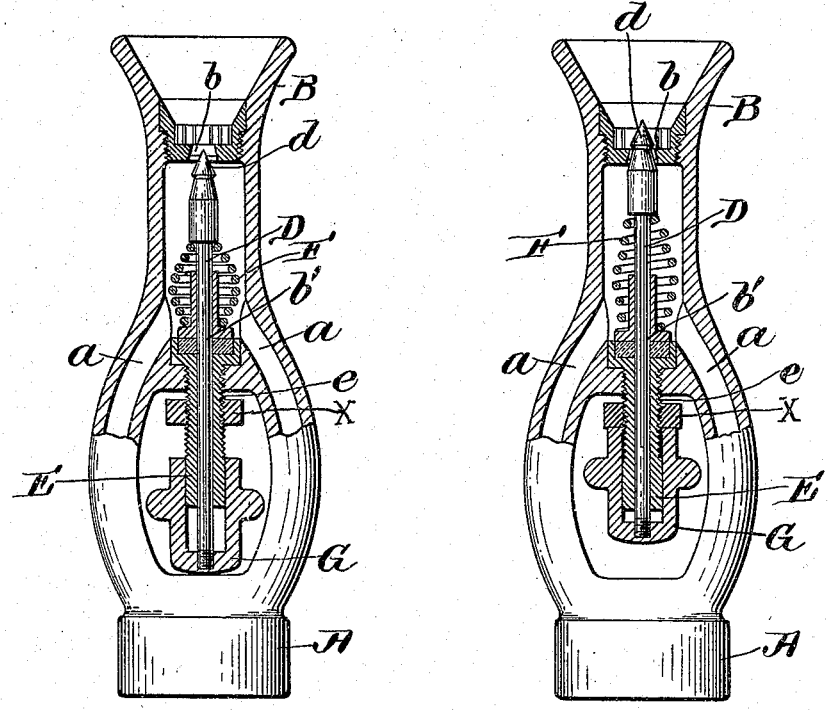

M. WARREN.
NOZZLE.
APPLICATION FILED SEPT. 26, 1907.

930,444.

Patented Aug. 10, 1909.

Witnesses:
Joseph T. Brennan.
Ruby M. Banfield.

Inventor:
Marion Warren,
by Oliver R. Mitchell,
Atty.

UNITED STATES PATENT OFFICE.

MARION WARREN, OF ROCHESTER, NEW YORK.

NOZZLE.

No. 930,444.

Specification of Letters Patent.

Patented Aug. 10, 1909.

Application filed September 26, 1907. Serial No. 394,672.

*To all whom it may concern:*

Be it known that I, MARION WARREN, a citizen of the United States, and resident of Rochester, in the county of Monroe and State of New York, have invented new and useful Improvements in Nozzles, of which the following is a specification.

My invention relates to improvements in hose nozzles. I have shown my invention in the drawing which is described in this specification in its application to a hose nozzle, but it is obvious that it is adapted for other uses where the outflow of fluid is to be regulated and controlled.

In the drawing:—Figure 1 is a plan view, partly in section, showing a hose nozzle embodying my invention, with the valve wide open. Fig. 2 is a plan view, partly in section, showing the valve nearly closed.

A is the connecting flange, screw threaded upon its interior, by means of which the nozzle is connected to the end of the rubber hose in the usual manner, *a a* are branch pipes through which the water or other fluid is carried and delivered at the rear end of the delivery section B of the nozzle. The delivery section B of the nozzle has a delivery aperture *b* at one end, a valve stem aperture *b'* at the opposite end and within the delivery section B and axially disposed therein is a valve stem D, the head of which *d* is properly proportioned with respect to the delivery aperture *b* to either close wholly or partially or open the same as the valve stem D is longitudinally moved.

Preferably screwed to the rear end of the delivery section is a guide tube E through which the rear end of the valve stem D passes. Around the valve stem and within the delivery section B is a helical spring F, one end of which abuts upon the nozzle and the other abuts upon the valve stem, so that the spring constantly tends to throw the valve stem to close the valve. The head *d* of the valve stem D when the valve stem is in its most advanced position closes the delivery aperture *b*, and the rear end of the stem D projects beyond the guide tube E and upon its projecting end is screwed a finger piece G which preferably fits upon the guide tube E. The outer surface of the guide tube E carries screw threads *e* upon which threaded portion is mounted a nut X which can be screwed along the guide tube E to any desired position.

The mode of operation is as follows: The operator by means of the finger piece G pulls back the valve stem D and permits the escape of the fluid from the nozzle. When it is desired to cut off the escape of the fluid, the valve stem is allowed to close under the influence of the spring F. If it is desired to adjust the nozzle to give a gentle spray for certain purposes by only partially opening the valve stem, this may be effected by screwing the nut X along the guide tube E until it comes in contact with the finger piece G and holds it at any desired position to give any desired stream. It is obvious that by means of the finger piece G the stream may be increased at any time over what it is set for by means of the nut X. By adjustment of the nut X it is therefore possible to arrange, despite the operation of the spring F, that the nozzle shall normally give any desired stream and this stream may be variously increased still leaving the minimum adjustment of the nut X.

In Fig. 1 the nozzle is shown in its most open position, the nut X being positioned to give a minimum or fine spray stream when the finger piece is released. In Fig. 2 the nozzle is shown held partially open, at a minimum adjustment by the nut X.

I claim:—

1. As a new article of manufacture, the nozzle above described, made up of a delivery section having openings at the discharge and rear ends; a guide tube at the rear end; a valve stem arranged within the delivery section and projecting through the guide tube; a spring operating constantly to throw the valve stem to close the valve; a finger piece secured to the extreme rear end of the valve stem; an adjustable stop movable along the guide tube, and coöperating with the finger piece to control the effect of the spring.

2. As a new article of manufacture, the nozzle above described, made up of a delivery section having openings at the discharge and rear ends; a guide tube at the rear end having screw threads upon its outer surface; a valve stem arranged within the delivery section and projecting through the guide tube; a spring operating constantly to throw the valve stem, to close the valve; a finger piece secured to the extreme rear end of the valve stem, a nut upon the screw threads of the guide tube and adjustable thereon to coöperate with the finger piece to control the effect of the spring.

Signed by me at Cleveland, Ohio, this twenty-third day of September, A. D. 1907.

MARION WARREN.

Witnesses:
JNO. P. DEMPSEY,
JAMES G. BACHMAN.